US007727066B2

(12) United States Patent
Ikeya et al.

(10) Patent No.: US 7,727,066 B2
(45) Date of Patent: Jun. 1, 2010

(54) GAME MACHINE, GAME MACHINE SYSTEM, AND METHOD OF CONTROLLING A GAME MACHINE REEL SPIN TIME

(75) Inventors: Tomonobu Ikeya, Tokyo (JP); Keiri Yoshioka, Tokyo (JP)

(73) Assignee: Konami Gaming, Inc., Las Vegas, NV (US)

( * ) Notice: Subject to any disclaimer, the term of this patent is extended or adjusted under 35 U.S.C. 154(b) by 1461 days.

(21) Appl. No.: 10/336,047

(22) Filed: Jan. 3, 2003

(65) Prior Publication Data

US 2003/0162586 A1 Aug. 28, 2003

(30) Foreign Application Priority Data

Jan. 7, 2002 (JP) ........................... P2002-000311

(51) Int. Cl.
*A63F 13/10* (2006.01)

(52) U.S. Cl. ........................................................ 463/25

(58) Field of Classification Search .................. 463/16, 463/20–22, 25; 278/138.1; 273/138.1
See application file for complete search history.

(56) References Cited

U.S. PATENT DOCUMENTS

| | | | | |
|---|---|---|---|---|
| 5,018,737 | A * | 5/1991 | Okada | 273/143 R |
| 5,024,439 | A * | 6/1991 | Okada | 273/143 R |
| 5,277,424 | A | 1/1994 | Wilms | |
| 5,603,659 | A * | 2/1997 | Okada | 463/25 |
| 5,758,875 | A * | 6/1998 | Giacalone, Jr. | 273/143 R |
| 6,206,781 | B1 * | 3/2001 | Sunaga et al. | 463/20 |
| 6,257,981 | B1 * | 7/2001 | Acres et al. | 463/26 |
| 7,019,475 | B2 * | 3/2006 | Nireki | 318/272 |
| 2002/0090989 | A1 * | 7/2002 | Yamaguchi | 463/20 |
| 2003/0130042 | A1 * | 7/2003 | Ollins | 463/43 |
| 2006/0247042 | A1 * | 11/2006 | Walker et al. | 463/29 |

FOREIGN PATENT DOCUMENTS

| | | | |
|---|---|---|---|
| JP | 60-148575 | A | 8/1985 |
| JP | 63-46185 | A | 2/1988 |
| JP | 63-49182 | | 3/1988 |
| JP | 63-102784 | | 5/1988 |
| JP | 10-094666 | | 4/1998 |
| JP | 10-151265 | | 6/1998 |
| JP | 2000-350808 | | 12/2000 |
| JP | 2001-079146 | * | 3/2001 |
| JP | 2001-79146 | | 3/2001 |
| JP | 2001-2327735 | | 11/2001 |

* cited by examiner

*Primary Examiner*—Scott Jones
(74) *Attorney, Agent, or Firm*—Masuvalley & Partners

(57) ABSTRACT

A game machine includes a monitor, a comparator and an adjuster. The monitor monitors a difference between the amount of game value inserted and the amount of game value paid. The comparator compares the difference with a preset reference value. The adjuster extends a game time of a game performed on the monitor when a result of the comparison that the difference is greater than the reference value is determined by the comparator.

11 Claims, 9 Drawing Sheets

FIG. 4

| Ci | Co | NUMBER OF LOSSES | GAME INTERVAL TIME | LOSS COEFFICIENT |
|---|---|---|---|---|
| 1 | 0 | 1 | 20 | 2.5 |
| 10 | 0 | 10 | 20 | 25 |
| 20 | 0 | 20 | 20 | 50 |
| 30 | 0 | 30 | 20 | 75 |
| 40 | 0 | 40 | 20 | 100 |
| 50 | 0 | 50 | 20 | 125 |
| 60 | 0 | 60 | 20 | 150 |
| 70 | 0 | 70 | 20 | 175 |
| 80 | 0 | 80 | 20 | 200 |
| 90 | 0 | 90 | 20 | 225 |
| 100 | 0 | 100 | 20 | 250 |
| 500 | 0 | 500 | 20 | 1250 |
| 1000 | 100 | 900 | 20 | 2250 |
| 2000 | 200 | 1800 | 20 | 4500 |
| 3000 | 500 | 2500 | 20 | 6250 |
| 4000 | 1000 | 3000 | 20 | 7500 |
| 5000 | 2000 | 3000 | 20 | 7500 |
| 6000 | 6000 | 0 | 20 | 0 |
| 7000 | 10000 | -3000 | 20 | -7500 |
| 10000 | 10000 | 0 | 20 | 0 |

| | |
|---|---|
| AVERAGE FOR FIVE MINUTES | 150 |
| ORDINARY AVERAGE OF TOKEN'S BET | 3 |
| NUMBER-OF-TOKEN'S BET COEFFICIENT | 50 |

GAME MACHINE, GAME MACHINE SYSTEM, AND METHOD OF CONTROLLING A GAME MACHINE REEL SPIN TIME

BACKGROUND OF THE INVENTION

The invention relates to a game machine, a game machine management system, and a game machine control method, which enable adjustment of a time required for playing games on the basis of the amount of game value inserted to and the amount of game value paid from the game machine.

A slot machine capable of adjusting a time required for playing games has been disclosed in, e.g., JP-A-63-49182. The slot machine is constructed so as to count the number of coins inserted at the beginning of a game and adjust a time required for playing one game from the time one game is started until the game ends, in accordance with the count value of the coins. Specifically, when a large number of coins are inserted, the number of games to be played within a unit time is limited by extending a game time. In contrast, when a small number of coins are inserted, a limitation on the number of games to be played within a unit time is removed. As a result, the number of inserted coins is limited to the number of coins stipulated by law or less. If the number of coins to be inserted per game is small, the time required for playing the game is shortened, thereby increasing the number of games and attempting to prevent a decrease in business availability of a game machine.

When a player continuously suffers more losses than wins, his/her judgment is atrophied and he/she fails to make a correct decision. However, there has never been available a game machine which affords the player a chance of regaining serenity when the player suffers continuous losses.

It is therefore an object of the present invention to provide a game machine and a method of controlling the game machine, which can afford a player a chance of regaining serenity when the player suffers continuous losses on the game machine.

SUMMARY OF THE INVENTION

In order to achieve the above object, according to the present invention, there is provided a game machine comprising:

a monitor for monitoring a difference between the amount of game value inserted and the amount of game value paid;

a comparator for comparing the difference with a preset reference value; and an adjuster for extending a game time of a game performed on the monitor when a result of the comparison that the difference is greater than the reference value is determined by the comparator.

Preferably, the difference is a result of subtracting a total amount of payout game value in which the game machine dispenses as award through at least one game from a total amount of inserted game value in which a player inserts into the game machine through at least one game.

In this configuration, when the amount of game value inserted has become greater than the amount of game value paid, the game time required from the start of one game until the end of the game becomes longer, thereby affording the player a time to reconsider the present circumstances calmly. Consequently, the player can recover his/her sense of judgment, thereby avoiding squandering of money. When the amount of game value paid has become greater than the amount of game value inserted, the player enjoys wins over games. Hence, the game time required from the start of one game until the end of the game is made longer, thereby affording the player a sufficient feeling of achievement and superiority.

Preferably, the game machine further comprising: a display for displaying a plurality of spinning reels, each reel having a plurality of symbols, and the adjuster extends a spinning time during the spinning reels spin at a predetermined speed before the spinning reels decelerate toward stop condition when the difference is greater than the reference value.

In this configuration, when the difference between the amount of game value inserted and the amount of game value paid is greater than a reference value, there is extended the spinning time during the spinning reels spin at a predetermined speed before the spinning reels decelerate toward stop condition. Hence, deceleration of the reels does not start soon after the start of spinning of the reels, thereby affording the player a time to reconsider the present circumstances calmly. Consequently, the player can recover his/her sense of judgment, thereby avoiding squandering of money.

Preferably, the game machine further comprising:

a display for displaying a plurality of spinning reels which spin at a predetermined speed, each reel having a plurality of symbols; and a stop unit, which stops each reel, wherein the adjuster extends a deceleration time wherein from the spinning reels start to decelerate until the spinning reels reach a stop condition when the difference is greater than the reference value.

In this configuration, when the difference between the amount of game value inserted and the amount of game value paid is greater than a reference value, the deceleration time wherein from the spinning reels start to decelerate until the spinning reels reach a stop condition is extended. Hence, the reels do not stop soon after the reels started deceleration, thereby affording the player a time to reconsider the present circumstances calmly. Consequently, the player can recover his/her sense of judgment, thereby avoiding squandering of money.

Preferably, the game machine comprising:

a display for displaying a plurality of spinning reels which spin at a predetermined speed, each reel having a plurality of symbols; and a spinning starter, which starts spin of each reel based on a starting operation by player, and the adjuster extends an acceleration time wherein from the spinning reels start to accelerate until the spinning reels reach the predetermined speed when the difference is greater than the reference value.

In this configuration, when the difference between the amount of game value inserted and the amount of game value paid is greater than a reference value, there is extended the acceleration time wherein from the spinning reels start to accelerate until the spinning reels reach the predetermined speed. Hence, the reels do not reach the predetermined speed soon after the reels are started, thereby affording the player time to reconsider the present circumstances calmly. Consequently, the player can recover his/her sense of judgment, thereby avoiding squandering of money.

Preferably, the game machine further comprising:

a display for displaying a plurality of spinning reels, each reel having a plurality of symbols; and a spinning starter, which starts spin of each reel based on a starting operation by player, and the adjuster extends a preliminary time wherein from the spinning starter is operated by the player until the spinning reels start to spin when the difference is greater than the reference value.

In this configuration, when the difference between the amount of game value inserted and the amount of game value paid is greater than a reference value, there is extended the preliminary time wherein from the spinning starter is operated by the player until the spinning reels start to spin. Hence, the spinning reels does not start soon after the player performs the starting operation, thereby affording the player a time to reconsider the present circumstances calmly. Consequently, the player can recover his/her sense of judgment, thereby avoiding squandering of money.

According to the present invention, there is also provided a game machine comprising:

monitor for monitoring a difference between the amount of game value inserted and the amount of game value paid;

a comparator for comparing the difference with a preset reference value; and an interval adjuster for extending an interval time from the completion of one game until the start of the next game, wherein the interval adjuster extends the interval time when a result of the comparison that the difference is greater than the reference value is determined by the comparator.

Preferably, the difference is a result of subtracting a total amount of payout game value in which the game machine dispenses as award through at least one game from a total amount of inserted game value in which a player inserts into the game machine through at least one game.

In this configuration, when the difference between the amount of game value inserted and the amount of game value paid is greater than a reference value, the time from completion of one game until start of the next game is extended. Hence, the player cannot start the next game soon after one game has ended, thereby affording the player a time to reconsider the present circumstances calmly. Consequently, the player can recover his/or her sense of judgment, thereby avoiding squandering of money.

According to the present invention, there is also provided a game machine, comprising:

a payout unit for paying game value; and a payout adjuster for adjusting a payout time during the game value is paid.

In this configuration, if the player has achieved a big win, the payout time required for paying game value can extended, to thereby afford the player a strong feeling of achievement and superiority. In contrast, the time required for payout is shortened, thereby enabling the player to play the next game soon within an allowed extent.

Preferably, the game machine further comprising:

a monitor for monitoring a difference between the amount of game value inserted and the amount of game value paid; and a comparator for comparing the difference with a preset reference value, and the payout adjuster extends the payout time when a result of the comparison that the difference is greater than the reference value is determined by the comparator.

Here, it is preferable that, the difference is a result of subtracting a total amount of payout game value in which the game machine dispenses as award through at least one game from a total amount of inserted game value in which a player inserts into the game machine through at least one game.

In this configuration, when the difference between the amount of game value inserted and the amount of game value paid is greater than a reference value, the payout time required for paying game value is extended. Hence, payment of game value does not end soon, to thereby afford the player a strong feeling of achievement and superiority. In contrast, if the player suffers big losses, the player can be afforded a time to reconsider the present circumstances calmly. Consequently, the player can recover his/her sense of judgment, thereby avoiding squandering of money.

Preferably, the game machine further comprising:

a reader, which reads personal data of a player from a data storage; and a communicator, which transmits and receives data concerning the amount of game value inserted and the amount of game value paid for the player specified by the personal data via a communication network.

Preferably, the game machine further comprising:

a reader, which reads personal data of a player from a data storage; and a communicator, which transmits and receives data concerning the amount of game value inserted and the amount of game value paid for the player specified by the personal data via a communication network.

Preferably, the game machine further comprising:

a reader, which reads personal data of a player from a data storage; and a communicator, which transmits and receives data concerning the amount of game value inserted and the amount of game value paid for the player specified by the personal data via a communication network.

In these configurations, the data concerning the amount of game value inserted and the amount of game value paid, the amounts concerning a player specified by the personal data can be intensively managed via the communication network. Consequently, there is enabled efficient ascertainment and management of the amount of game value inserted and the amount of game value paid, the amounts concerning each player.

According to the present invention, there is also provided a system of managing the above game machines, comprising;

a game machine manager, which manages data concerning the amount of game value inserted and the amount of game value paid for a player specified by the personal data, the data received from at least one of game machines via the communication network.

According to the present invention, there is also provided a system of managing the above game machines, comprising;

a game machine manager, which manages data concerning the amount of game value inserted and the amount of game value paid for a player specified by the personal data, the data received from at least one of game machines via the communication network.

According to the present invention, there is also provided a system of managing the above game machines, comprising;

a game machine manager, which manages data concerning the amount of game value inserted and the amount of game value paid for a player specified by the personal data, the data received from the at least one of game machines via the communication network.

These above configurations enables concentrated management, via the communication network, of the data pertain to the amount of game value inserted and the amount of game value paid, the amounts concerning a player specified by the personal data. Consequently, there is enabled efficient ascertainment and management of the amount of game value inserted and the amount of game value paid, the amounts concerning each player.

According to the present invention, there is also provided a method of controlling a game machine, comprising the steps of:

monitoring a difference between the amount of game value inserted and the amount of game value paid;

comparing the difference with a preset reference value; and extending a game time of a game performed on the monitor when the difference is greater than the reference value.

Preferably, the difference is a result of subtracting a total amount of payout game value in which the game machine dispenses as award through at least one game from a total amount of inserted game value in which a player inserts into the game machine through at least one game.

In this method, when the amount of game value inserted has become greater than the amount of game value paid, the game time required from the start of one game until the end of the game becomes longer, thereby affording the player a time to reconsider the present circumstances calmly. Consequently, the player can recover his/her sense of judgment, thereby avoiding squandering of money. When the amount of game value paid has become greater than the amount of game value inserted, the player enjoys wins over games. Hence, the time required from the time of start of one game until the end of the game is made longer, thereby affording the player a sufficient feeling of achievement and superiority.

Preferably, the method further comprising the steps of:

displaying a plurality of spinning reels, each reel having a plurality of symbols; and extending a spinning time during the spinning reels spin at a predetermined speed before the spinning reels decelerate toward stop condition when the difference is greater than the reference value.

In this method, when the difference between the amount of game value inserted and the amount of game value paid is greater than a reference value, the spinning time during the spinning reels spin at a predetermined speed before the spinning reels decelerate toward stop condition is extended. Hence, deceleration of the reels does not start soon after the reels spin at a predetermined speed, thereby affording the player a time to reconsider the present circumstances calmly. Consequently, the player can recover his/her sense of judgment, thereby avoiding squandering of money.

Preferably, the method further comprising the steps of:

displaying a plurality of spinning reels which spin at a predetermined speed, each reel having a plurality of symbols;

stopping each reel; and extending a deceleration time wherein from the spinning reels start to decelerate until the spinning reels reach a stop condition when the difference is greater than the reference value.

In this method, when the difference between the amount of game value inserted and the amount of game value paid is greater than a reference value, the deceleration time wherein from the spinning reels start to decelerate until the spinning reels reach a stop condition is extended. Hence, the reels do not stop soon after the reels started decelerating, thereby affording the player a time to reconsider the present circumstances calmly. Consequently, the player can recover his/her sense of judgment, thereby avoiding squandering of money.

Preferably, the game machine control method further comprising the steps of:

displaying a plurality of spinning reels which spin at a predetermined speed, each reel having a plurality of symbols;

starting spin of each reel based on a starting operation by player; and extending an acceleration time wherein from the spinning reels start to accelerate until the spinning reels reach the predetermined speed when the difference is greater than the reference value.

In this method, when the difference between the amount of game value inserted and the amount of game value paid is greater than a reference value, an acceleration time wherein from the spinning reels start to accelerate until the spinning reels reach the predetermined speed is extended. Hence, the reels do not reach the predetermined speed soon after the spin of the reels are started, thereby affording the player a time to reconsider the present circumstances calmly. Consequently, the player can recover his/her sense of judgment, thereby avoiding squandering of money.

Preferably, the method further comprising the steps of:

displaying a plurality of spinning reels, each reel having a plurality of symbols;

starting spin of each reel based on a starting operation by player; and extending a preliminary time wherein from the starting operation by the player until the spinning reels start to spin when the difference is greater than the reference value.

In this configuration, when the difference between the amount of game value inserted and the amount of game value paid is greater than a reference value, the preliminary time wherein from the starting operation by the player until the spinning reels start to spin is extended. Hence, the reels does not start soon after the player performs the starting operation, thereby affording the player a time to reconsider the present circumstances calmly. Consequently, the player can recover his/her sense of judgment, thereby avoiding squandering of money.

According to the present invention, there is also provided a method of controlling a game machine comprising the steps of:

monitoring a difference between the amount of game value inserted and the amount of game value paid;

comparing the difference with a preset reference value; and extending an interval time from the completion of one game until the start of the next game when the difference is greater than the reference value.

Preferably, the difference is a result of subtracting a total amount of payout game value in which the game machine dispenses as award through at least one game from a total amount of inserted game value in which a player inserts into the game machine through at least one game.

In this method, when the difference between the amount of game value inserted and the amount of game value paid is greater than a reference value, the interval time from the completion of one game until the start of the next game is extended. Hence, the player cannot start the next game soon after one game has ended, thereby affording the player a time to reconsider the present circumstances calmly. Consequently, the player can recover his/her sense of judgment, thereby avoiding squandering of money.

According to the present invention, there is also provided a method of controlling a game machine, comprising the steps of:

paying game value; and adjusting a payout time during the game value is paid.

In this method, if the player has achieved a big win, the time required for paying game value can be extended, to thereby afford the player a strong feeling of achievement and superiority. In contrast, the time required for payout is shortened, thereby enabling the player to play the next game soon, within an allowed extent.

Preferably, the method further comprising the steps of:

monitoring a difference between the amount of game value inserted and the amount of game value paid;

comparing the difference with a preset reference value; and extending the payout time when the difference is greater than the reference value.

Here it is preferable that, the difference is a result of subtracting a total amount of payout game value in which the game machine dispenses as award through at least one game from a total amount of inserted game value in which a player inserts into the game machine through at least one game.

In this method, when the difference between the amount of game value inserted and the amount of game value paid is greater than a reference value, the payout time during the game value is paid is extended. Hence, payment of game value does not end soon, to thereby afford the player a strong feeling of achievement and superiority. In contrast, if the player suffers big losses, the player can be afforded a time to reconsider the present circumstances calmly. Consequently, the player can recover his/her sense of judgment, thereby avoiding squandering of money.

Preferably, the method further comprising the steps of:

reading personal data of a player from a data storage; and transmitting and receiving data concerning the amount of game value inserted and the amount of game value paid for the player specified by the personal data via a communication network.

Preferably, the method further comprising the steps of:

reading personal data of a player from a data storage; and transmitting and receiving data concerning the amount of game value inserted and the amount of game value paid for the player specified by the personal data via a communication network.

Preferably, the method further comprising the steps of:

reading personal data of a player from a data storage; and transmitting and receiving data concerning the amount of game value inserted and the amount of game value paid for the player specified by the personal data via a communication network.

These methods enable concentrated management, via the communication network, of the data pertain to the amount of game value inserted and the amount of game value paid, the amounts concerning the player specified by the personal data. Consequently, there is enabled efficient ascertainment and management of the amount of game token inserted and the amount of game token paid, the amounts concerning each player.

BRIEF DESCRIPTION OF THE DRAWINGS

The above objects and advantages of the present invention will become more apparent by describing in detail preferred exemplary embodiments thereof with reference to the accompanying drawings, wherein:

FIG. 4 is a diagram showing an example of computation of a loss coefficient;

DETAILED DESCRIPTION OF THE PREFERRED EMBODIMENTS

A slot machine according to an embodiment of the invention will be described below. However, the invention is not limited solely to a slot machine and is applicable to all pieces of apparatus (i.e., apparatus to be used for playing games) which enable a player to determine a start timing of games by inserting a game value (e.g., tokens, paper currency, coins, or some form of credit indicator, such as a credit card) of his/her own will. The embodiment will be described by means of taking tokens (or coins) as an example. This does not purport to limit the game value to tokens. The game token corresponds to all capable of affording gaming values, such as pachinko balls.

Figure 1:
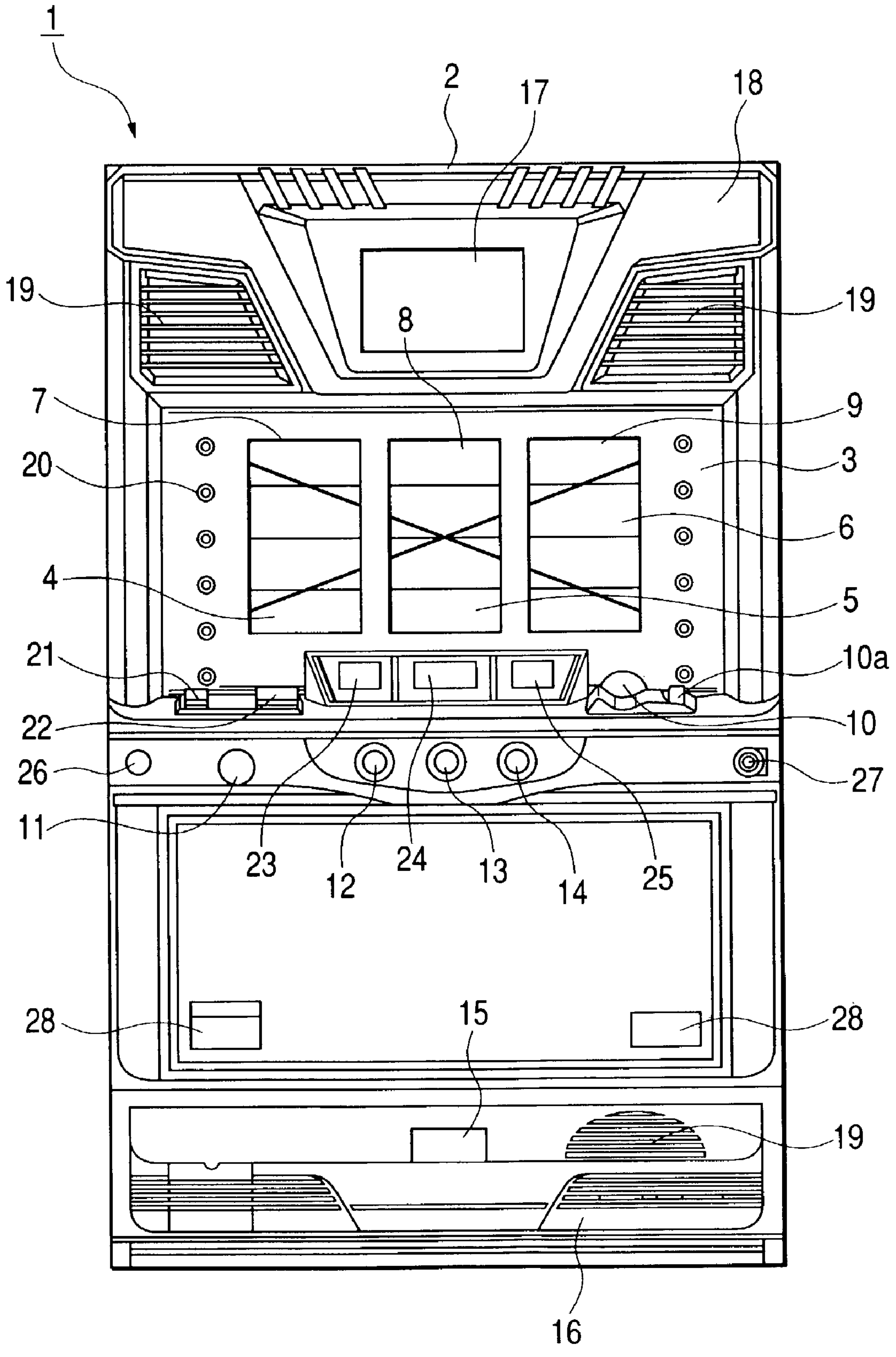
FIG. 1 is a view showing a slot machine according to an embodiment of the invention.

In FIG. 1, a slot machine 1 comprises a housing 2, and a front panel 3 reclosably attached to the front of the housing 2. Three reels 4, 5, and 6 are provided in parallel on the back of the front panel 3. Various types of symbols are drawn on the outer peripheral surfaces of the respective reels 4, 5, and 6. The symbols are illuminated from behind by unillustrated backlight provided for the respective reels. The symbols are observed through symbol display windows 7, 8, and 9 such that at any given time three symbols can be observed in each display window.

A total of five winning lines are provided across the symbol display windows 7 through 9. Specifically, one horizontal center line, one horizontal upper line, one horizontal lower line, and two sloped lines are provided. A slot machine game is started by means of a player specifying a valid winning line(s) by performing a betting operation. The betting operation is performed by inserting a token into a token insert slot 10 to be described later or betting some of stored tokens through use of a stored token insert button 21. A betting operation can be performed by combination of these betting operations. Betting of one token makes only the horizontal center line valid. Betting of two tokens makes the horizontal center line and the horizontal upper and lower lines valid. Betting of three tokens makes the horizontal center line, the horizontal upper and lower lines, and the two sloped lines valid.

Formed in the front surface of the housing 2 are the token insert slot 10 and a token return button 10*a* to be used for returning tokens when the insert slot 10 is clogged with inserted tokens. A start lever 11 is used for performing an operation for starting spinning of the reels 4 through 6. Stop buttons 12, 13, 14 are provided for the respective reels 4 through 6, to thereby stop spinning actions of the respective reels 4 through 6 individually. The reels 4 through 6 are spun in response to actuation of the start lever performed by the player, and symbols appear in the respective symbol display windows 7 through 9 while being spun in the vertical direction. When the reels 4 through 6 reach a given rotating speed, actuation of the stop buttons provided so as to correspond to the respective reels 4 through 6 becomes effective. The player actuates each of the stop buttons while observing the symbols that are spinning, thereby stopping spinning actions of the reels 4 and attempting to display desired symbols along any of the winning lines. The reels 4 through 6 are stopped at a timing at which the stop buttons are actuated. If a predetermined combination of symbols has been displayed, a win corresponding to the winning combination is achieved.

A token payout port 15 and a token receiver 16 are provided at lower positions on the front panel 3. Disposed at an upper position on the front panel 3 is a game presentation indicator 17 to be activated for game presentation purpose. The game presentation indicator 17 is constituted of, e.g., LCDs or various types of lamps. The embodiment shows an example game presentation indicator employing LCDs. A bonus game indicator 18 is provided at an upper position on the front panel 3. The bonus game indicator 18 is constituted of LEDs and shows a win for a BB (big bonus) prize or RB (regular bonus) prize, a BB winning combination or RB winning combination, game presentation, occurrence of an error, and occurrence of a play-out state. Speakers 19 emit a voice guide, music, or sound effects.

Through illumination, extinction, or blinking operations, a plurality of lamps 20 provided on the front panel 3 provide a display concerning a game, such as a display of a winning line(s) which has been made valid in accordance with the number of inserted tokens; a display of the reels 4 through 6 being able to spin; and a display of determination of a win. The stored token insert button 21 is for using a specified maximum number of tokens from among the tokens stored in an unillustrated token storage device. A number-of-stored-tokens display section 23 displays the number of tokens stored in the unillustrated token storage device. A number-of-wins display section 24 shows the number of wins and the number of remaining wins when a win for a BB or RB prize is achieved. A number-of-tokens-to-be-paid display section 25 displays the number of tokens to be paid. The number-of-stored-tokens display section 23, the number-of-wins display section 24, and the number-of-tokens-to-be-paid display section 25 are constituted of, e.g., LEDs. A settlement button 26 performs settlement of stored tokens. A locking device 27 is for canceling a play-out state or opening a door, depending on the direction in which it is turned. A label 28 has descriptions, such as the model of the slot machine 1 and the name of a manufacturer of the slot machine.

Figure 2:
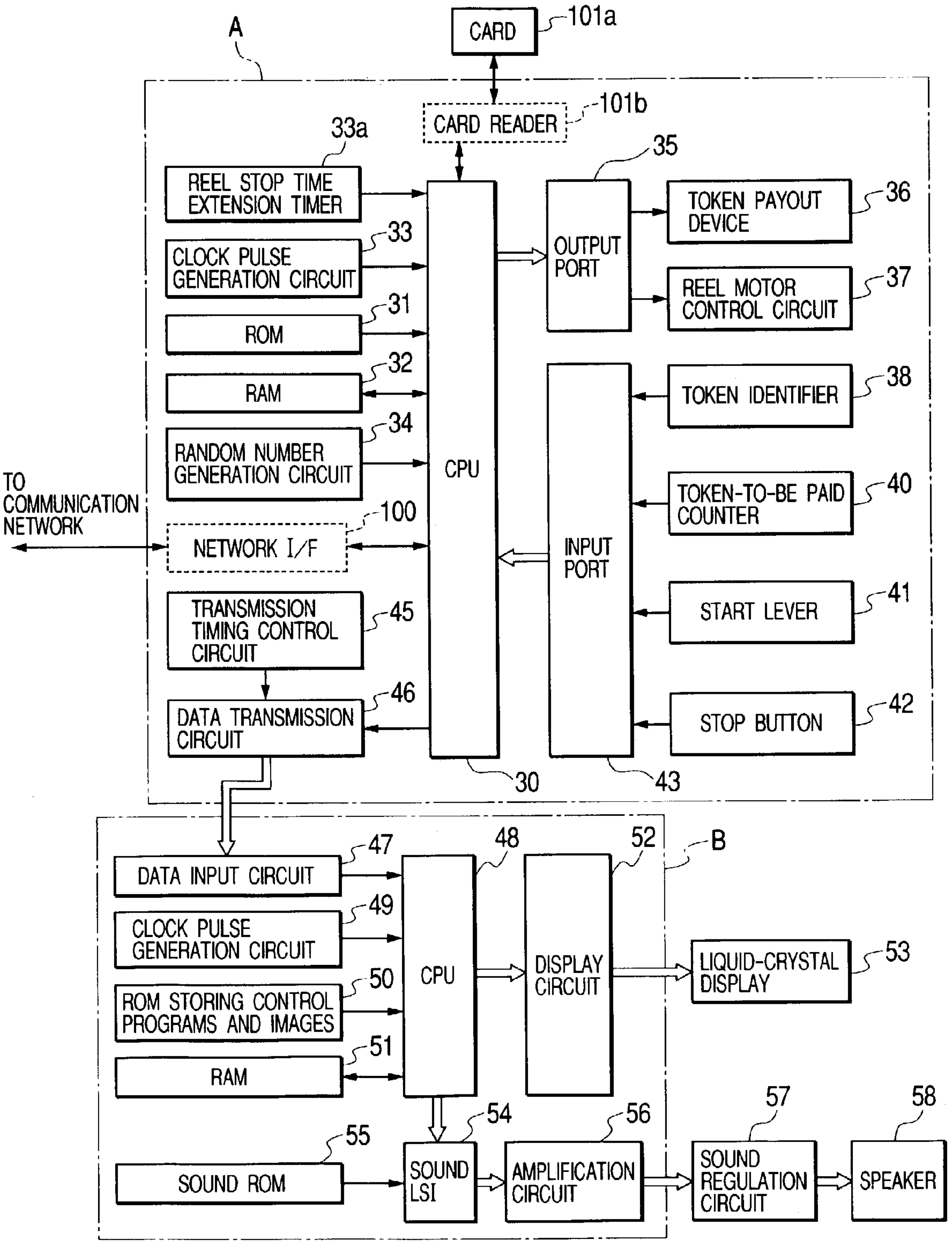
FIG. 2 is a block diagram showing the electrical configuration of the slot machine.

In FIG. 2, a slot machine of the embodiment is electrically constituted of a main board A and a sub-board B. The main board A has a CPU 30, ROM 31, and RAM 32 and performs control operation in accordance with a preset program. The CPU 30, the ROM 31, and the RAM 32 constitute monitor, comparator, adjuster, interval adjuster, and payout adjuster. A prize group sampling table to be used for performing preliminary determination of a prize group (i.e., internal sampling), and a control program for controlling the operation of the slot machine 1 are stored in the ROM 31.

The CPU 30 is connected to a clock pulse generation circuit 33 for generating a reference clock pulse signal; a reel stop time extension timer 33*a* for extending a reel stop time; and a random number generation circuit 34 for producing given random numbers. Control signal transmitted from the CPU 30 is output to a token payout device 36 for paying tokens, and to a reel motor control circuit 37 for spinning the three reels 4, 5, 6 of the slot machine 1 via an output port 35. The reels 4 through 6 and the reel motor control circuit 37 constitute display, and the token payout device 36 constitutes payout unit.

A signal output from a token determination device 38 for authenticating tokens; a signal output from a token counter 40 for counting the number of tokens to be paid; a signal output from a start lever 41 for starting spinning of reels; and a signal output from a stop button 42 for stopping spinning of the reels are input to the CPU 30 via an input port 43. The spinning starter is constituted of the start levers 11 and 41. The CPU 30 and the stop buttons 12 to 14 and 42 constitute stop unit. A signal output from the CPU 30 is delivered to the sub-board B via a data transmission circuit 46 under control of a transmission timing control circuit 45 for controlling a timing at which a signal is to be transmitted to the sub-board B.

On the sub-board B, the signal output from the data transmission circuit 46 is input to a data input circuit 47. The signal that has been input to the data input circuit 47 is processed by a CPU 48. The CPU 48 is connected to a clock pulse signal generation circuit 49 for generating a reference clock pulse signal; ROM 50 in which various programs and image data are recorded; and RAM 51. Data concerning images are output from the CPU 48 to a liquid-crystal display 53, by way of a display circuit 52 which performs image processing operation. The liquid-crystal display 53 displays characters, stationary images, motion pictures, or like images.

Data concerning sound are output from the CPU 48 to an amplifier circuit 58 via a sound LSI 54 which performs sound processing or like processing. The sound LSI 54 extracts required sound data from sound ROM 55 and processes the thus-extracted sound data. The sound data are subjected to processing, such as amplification, in an amplification circuit 56 are output to a speaker 58, by way of a sound regulation circuit 57 for regulating sound.

The above configuration is that of a stand-alone-type slot machine. As shown in FIG. 2, so long as the slot machine is provided with a network interface 100 serving as transmit/receive unit, the slot machine can be constructed as a network-type slot machine which exchanges data with the management system via a communications network. Moreover, if the slot machine is provided with a card reader 101*b* which serves as a reader for reading personal data concerning a player from a card 101*a* serving as a data storage, the slot machine can efficiently manage a history of games of an individual player. The slot machine may be provided with a paper money identification unit for identifying paper money, and the token identification device 38 as well. Further, the slot machine may be provided with a ticket printer for issuing tickets.

Characteristic operation of the slot machine of the embodiment will now be described. Here, the slot machine monitors a difference between the number of tokens inserted and the number of tokens paid, and compares the difference with a preset reference value. If the difference is greater than the reference value, a game time is extended.

Figure 3:
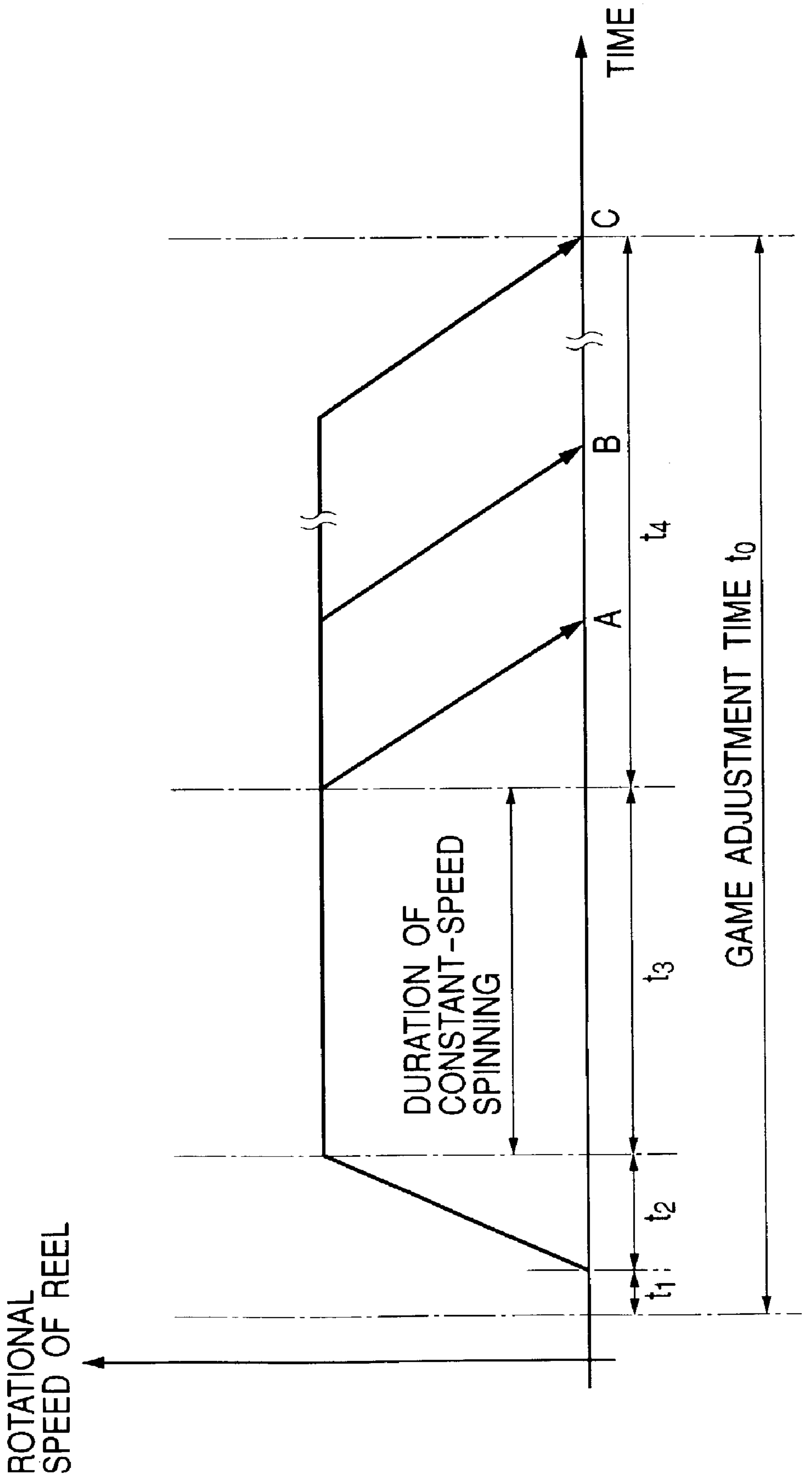
FIG. 3 is a diagram showing a relationship between a rotational speed of reels and a game adjustment time.

As shown in FIG. 3, the slot machine takes a time from actuation of a start lever until when all the reels are stopped; that is, time $t_0$, as a game adjustment time. The game adjustment time $t_0$ is an aggregate of time $t_1$, time $t_2$, time $t_3$ and time $t_4$. The time $t_1$ required from actuation of a start button until the reels start spinning. The time $t_2$ is required from when the reels start spinning until the reels achieve a predetermined rotational speed. The time $t_3$ is required for continuously spinning at a predetermined rotational speed. The time $t_4$ is required from when the first reel starts deceleration for stoppage until the final reel are stopped. Here, an explanation is given of a case that the time $t_3$ required for the reels to continuously spin at the predetermined rotational speed is extended when a difference between the number of inserted tokens and the number of tokens paid is greater than the reference value.

First will be described coefficients and a formula which are required for extending a game time. A coefficient; that is, the number of lost tokens, is determined from a difference between the number of tokens inserted for playing games and the number of tokens paid. In other words, it is provided that the number of tokens inserted for playing games is taken as $C_i$ and the number of tokens paid for a game result is taken as Co, the number of lost tokens is determined by Equation (1).

$$\text{(Number of lost tokens)} = C_i - C_o \quad (1)$$

Next, in order to reflect fluctuating variations in the number of tokens bet by the player, another coefficient; that is, the number of tokens bet by the player within a unit time (i.e., the number of tokens used), is determined by Equation (2).

(Number-of-tokens-bet coefficient $B_f$)=(average number of tokens bet by the player per five minutes in games played today)/(average number of tokens bet on slot machines of the same model and money type in the same parlor) (2)

Here, an average of tokens bet per five minutes is computed in connection with the Number-of-tokens-bet coefficient $B_f$, whereby the coefficient is updated every five minutes. Further, the same money type means tokens (coins) having identical money values. Slot machines for 5 cents, those for 10 cents, those for 25 cents, and those for one dollar are available. In addition, the same model means that slot machines of identical model from among 3-Coin Multiplier slot machines, 5-Coin Multiplier slot machines, 3-Line Pay slot machines, 5-Line Pay slot machines, 3-Coin Buy-A-Pay slot machines, and 3-Coin, 9-Line Pay slot machines.

Next, Equation (3) is used to calculate a game interval time coefficient $I_t$ for representing, in 0.1 seconds, seconds required from the end of a preceding game until start of the next game today.

(Game interval time coefficient $I_t$)=10×{(End time of preceding game)−(Start time of current game)} (3)

For instance, it is provided that the end time of a preceding game is 8:30 a.m. 30 sec. and the start time of a current game is 8:30 a.m. 31.2 sec, the game interval time coefficient is determined as $I_t$=10×(31.2−30.0)=12 from Equation (3).

Next, a loss coefficient L of the current player is determined according to Equation (4).

(Loss coefficient $L$)={($Ci-C0$)×(Number-of-tokens-bet coefficient $B_f$)}/(game interval time coefficient $I_t$) (4)

A loss coefficient is computed according to Equations (1) through (4). For instance, as shown in FIG. 4, provided that an average of tokens bet by a player per five minutes in games on that day is 150 and that an ordinary average of tokens bet on slot machines of the same model and money type in the same parlor is three, the number-of-tokens-bet coefficient $B_f$ is 150.3÷50. In FIG. 4, if a case where $C_i$=1000 and $C_0$=100 is taken as an example, there will be obtained (Loss coefficient L)=(1000−100)×50/20=2250.

Figure 5:
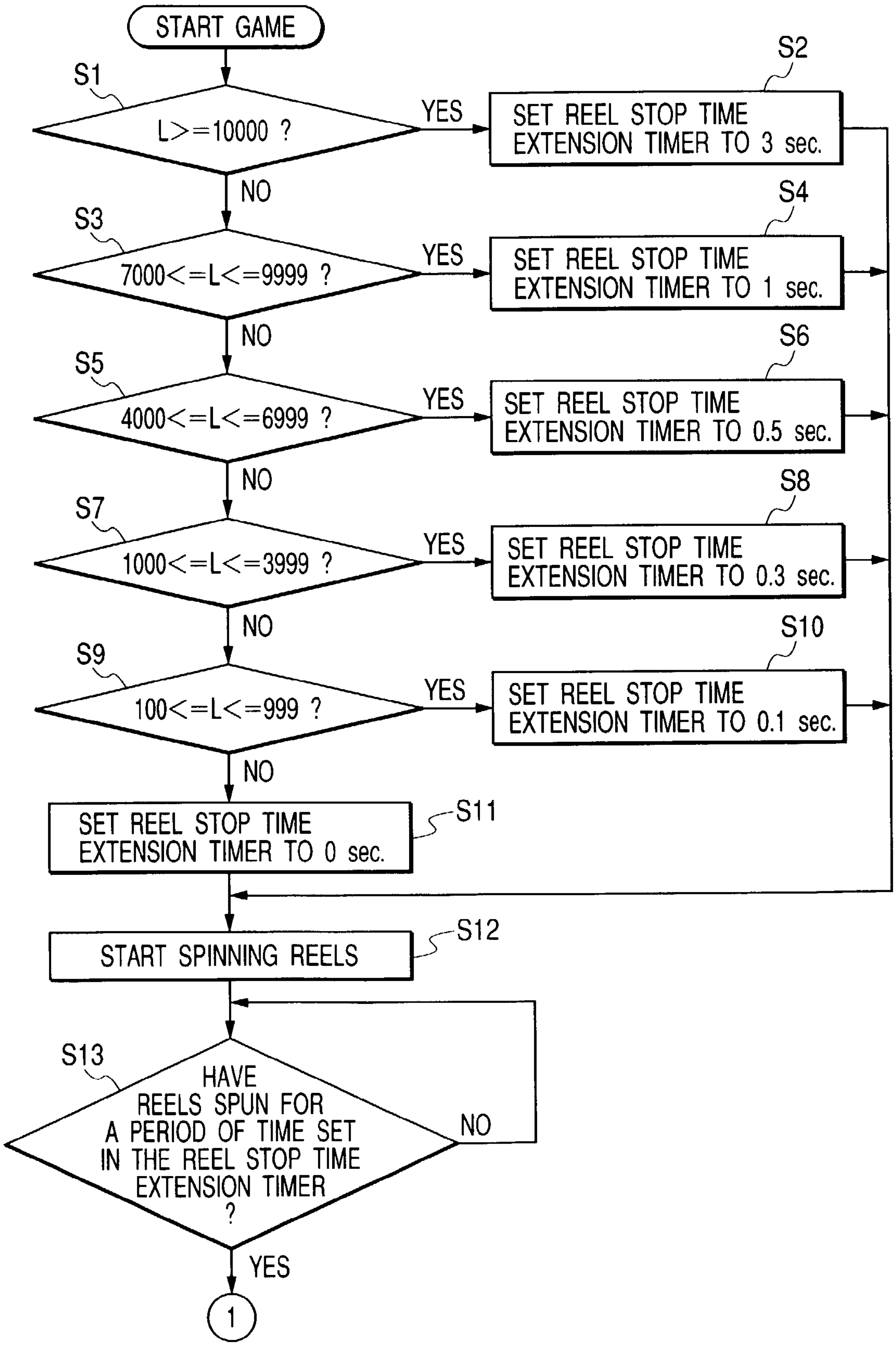
FIG. 5 is a flowchart showing operation of the slot machine.
Figure 6:
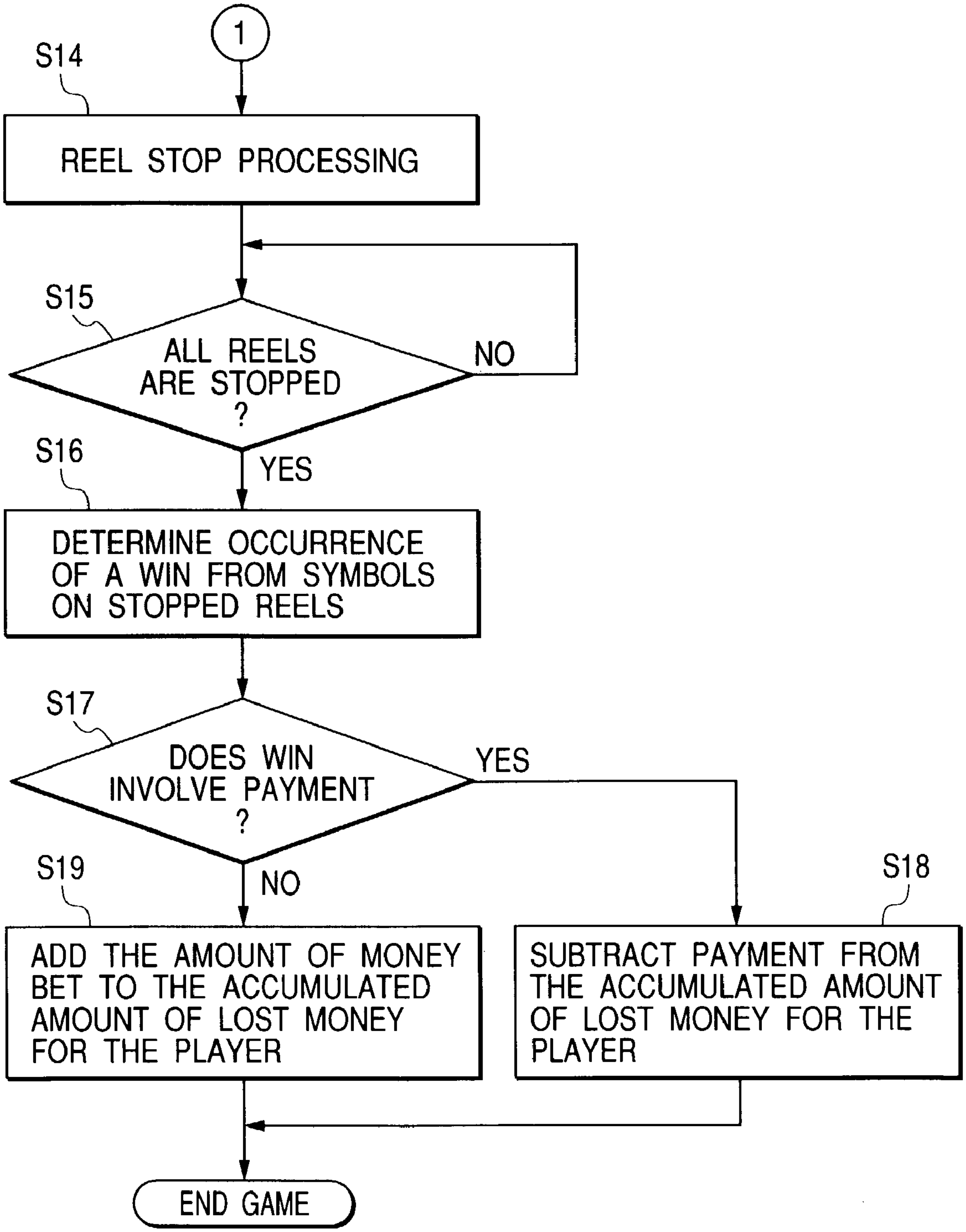
FIG. 6 is a flowchart showing operation of the slot machine.

There will now be described an operation for extending a game time using the coefficients determined in the manner set forth, by reference to flowcharts shown in FIGS. 5 and 6. First, tokens are bet, and the start lever 11 is actuated, thereby starting a game. When the game is started, the CPU 30 determines whether or not the loss coefficient L assumes a value of 10000 or more (step S1). If the loss coefficient L assumes a value of 10000 or more, the reel stop time extension timer 33*a* is set to three seconds (step S2), and processing proceeds to step S12. In contrast, if the loss coefficient L does not assume a value of 10000 or more, a determination is made as to whether or not the loss coefficient L assumes a value ranging from 7000 to 9999 (step S3). If the loss coefficient L assumes a value ranging from 7000 to 9999, the reel stop time extension timer 33*a* is set to one second (step S4), and processing proceeds to step S12.

When in step S3 the loss coefficient L does not assume the value ranging from 7000 to 9999, a determination is made as to whether or not the loss coefficient L assumes a value ranging from 4000 to 6999 (step S5). If the loss coefficient L assumes a value ranging from 4000 to 6999, the reel stop time extension timer 33*a* is set to 0.5 second (step S6), and processing proceeds to step S12. In contrast, if the loss coefficient L does not assume a value ranging from 4000 to 6999, a determination is made as to whether or not the loss coefficient L assumes a value ranging from 1000 to 3999 (step S7). If the loss coefficient L assumes a value ranging from 1000 to 3999, the reel stop time extension timer 33*a* is set to 0.3 second (step S8), and processing proceeds to step S12. In contrast, if the loss coefficient L does not assume a value ranging from 1000 to 3999, a determination is made as to whether or not the loss coefficient L assumes a value ranging from 100 to 999 (step S9). If the loss coefficient L assumes a value ranging from 100 to 999, the reel stop time extension timer 33*a* is set to 0.1 second (step S10), and processing proceeds to step S12. In contrast, if the loss coefficient L does not assume a value ranging from 100 to 999, the reel stop time extension timer 33*a* is set to 0 second (step S11).

Figure 7:
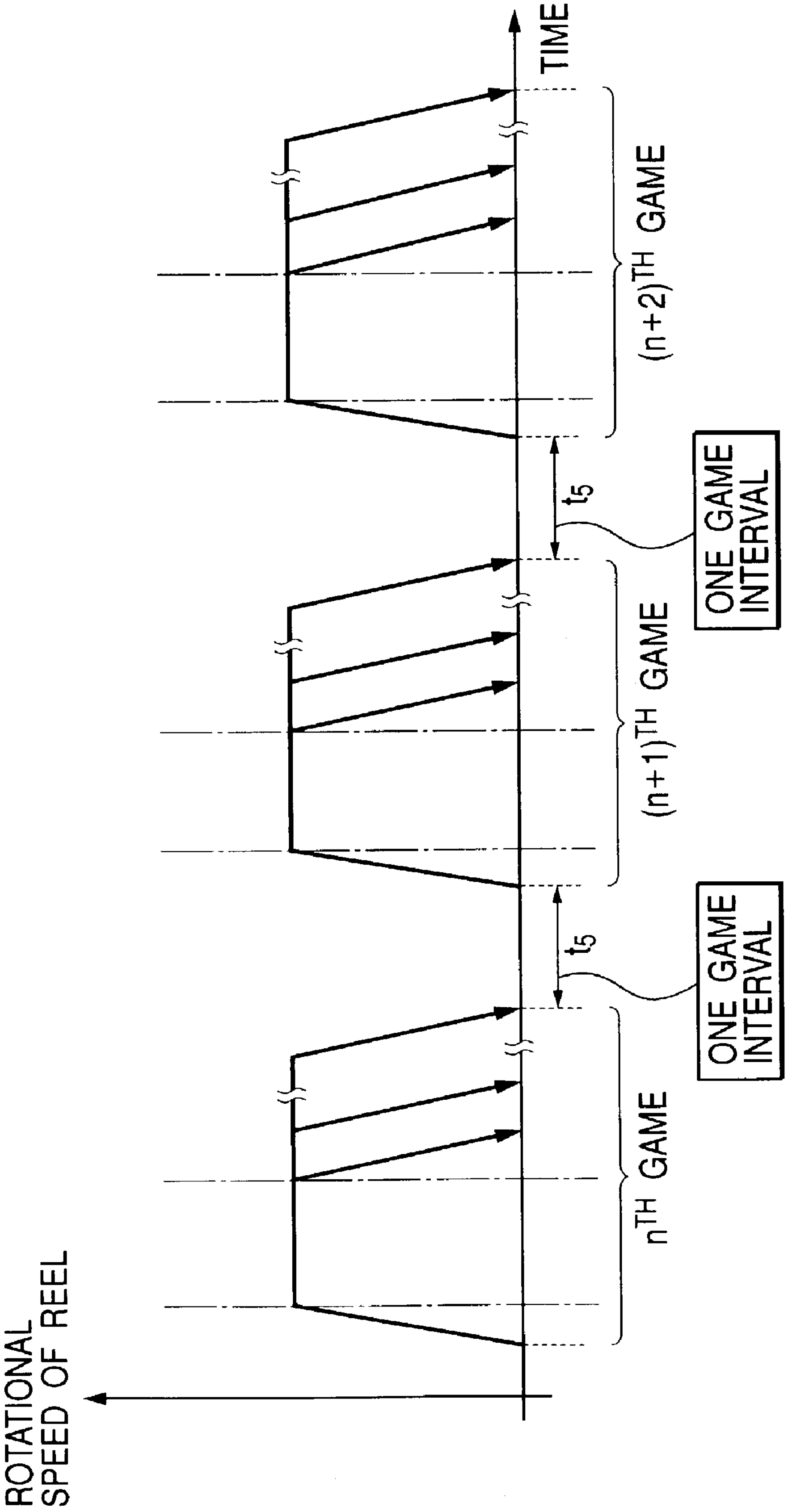
FIG. 7 is a diagram showing a relationship between the rotational speed of reels and the game adjustment time.

After completion of the foregoing processing operations, the reels 4 through 6 start spinning (step S12). When the reels 4 through 6 have reached a predetermined rotational speed, a determination is made whether or not each of the reels 4 through 6 has spun for a period of time set in the reel stop time extension timer 3*a* (step S13). As shown in FIG. 7, the reels 4 through 6 spin at a given rotational speed for a period of time $t_3$ set in the reel stop time extension timer 33*a*. If the loss coefficient L of the player is large, the time $t_3$ set in the reel stop extension timer 33*a* become larger. Hence, the time $t_3$ is understood to become longer as the number of games "n" increases.

As mentioned above, the time during which the reels 4 through 6 spin at a predetermined rotational speed is extended when the loss coefficient L is large. In other words, the reels does not start to decelerate itself soon after the reels spin at the predetermined rotational speed. Therefore, the player is afforded a time to reconsider the present circumstances calmly. Consequently, the player can recover his/her sense of judgment such that squandering of money is avoided.

In step S13, when the reels 4 through 6 have not yet spun for a period of time set in the reel stop time extension timer 33*a*, a determination to be made in step S13 is repeated. If the reels 4 through 6 have spun for a period of time set in the reel stop time extension timer 33*a*, reel stop processing is performed (step S14). Specifically, in the case of the slot machine, actuation of the stop buttons 12 through 14 becomes possible. In the case of a game machine which does not have any stop buttons, such as a gaming machine, the first reel is decelerated toward a stop condition. Next, a determination is made as to whether or not all the reels are stopped (step S15). If not all the reels are stopped, the determination to be made in step S15 is repeated. If all the reels are stopped, a determination is made as to whether or not a win is achieved by symbols on the reels (step S16). Next, a determination is made as to whether or not the win has a payout (step S17). If the win has a payout, the payout is subtracted from the number of lost tokens (step S18), and the game ends. In contrast, if the win is determined not to involve a payout in step S17, the amount of tokens bet is added to the number of lost tokens (step S19), and the game ends.

The explanation has been given of the embodiment in which the time $t_3$ during which the reels 4 through 6 continue spinning at a predetermined rotational speed is extended. As shown in FIG. 3, in accordance with the loss coefficient L, the time $t_1$ required from actuation of the start button until the reels start spinning may be extended. In this way, if the time $t_1$ required from actuation of the start button until the reels start spinning is extended when the loss coefficient L is large, the reels do not start spinning soon after the player actuates the start button. The player is then afforded a time to reconsider the present circumstances calmly, as a result of which the player can recover his/her sense of judgment and avoid squandering of money.

Also, the time $t_4$ required from when the first reel starts decelerating for stop condition until the final reel is stopped may be extended in accordance with the loss coefficient L. In this way, if the time $t_4$ required from when the first reel starts decelerating for stop condition until the final reel is stopped is extended when the loss coefficient L is large. Therefore, the reels are not stopped soon after deceleration of the reels is started. As a result, the player can be afforded time to reconsider the present circumstances calmly. Consequently, the player recovers his/her sense of judgment, thereby avoiding squandering of money.

Figure 8:
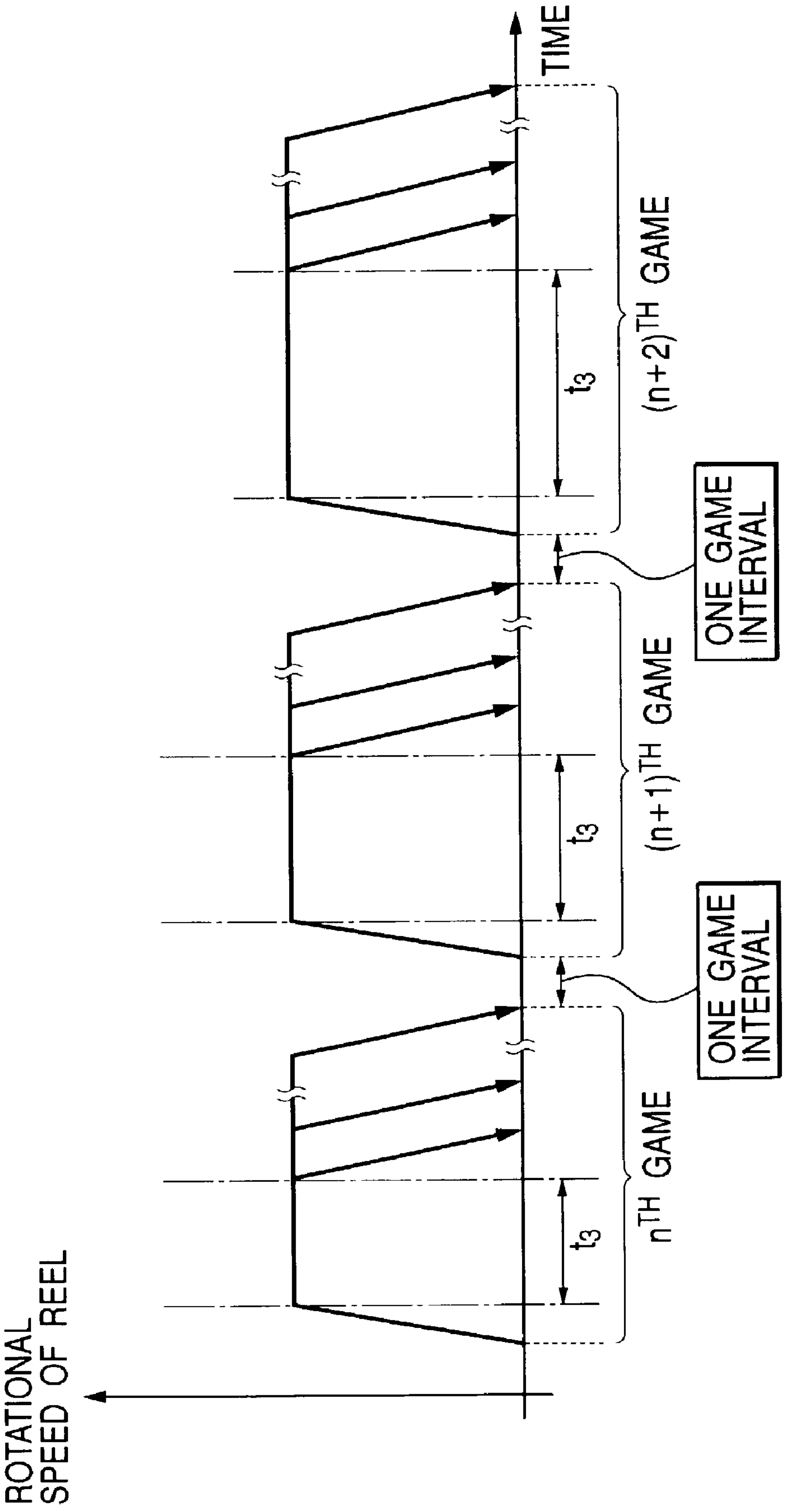
FIG. 8 is a diagram showing the relationship between the rotational speed of reels and the game adjustment time.

The interval between games may be increased in accordance with the loss coefficient L. Here, the game interval means a period of time from the end of one game until the next betting operation becomes available. As shown in FIG. 8, the time interval $t_5$ of one game is extended in accordance with the loss coefficient L. Then, after one game is completed, the next game cannot be started until the time interval $t_5$ is passed. As a result, the player can be afforded time to reconsider the present circumstances calmly. Hence, the player can recover his/her sense of judgment, thereby avoiding squandering of money.

Figure 9:
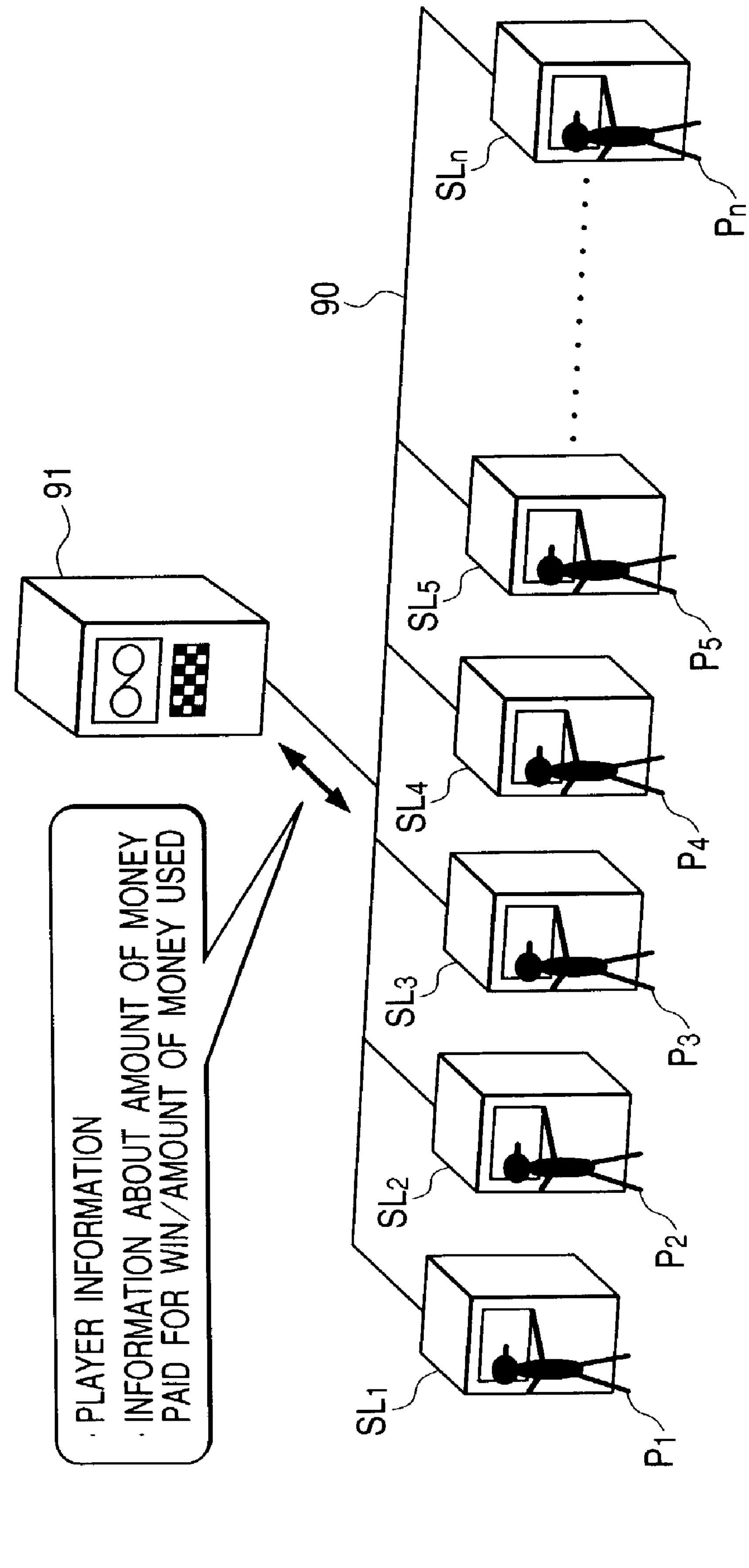
FIG. 9 is a view schematically showing a management system for managing the slot machines.

There will now be described a game machine management system to be applied to the slot machine of the embodiment, by reference to FIG. 9. A plurality of slot machines $SL_1$ to $SL_n$ shown in FIG. 9 are provided with the network interfaces 100 shown in FIG. 2, respectively. The network interfaces 100 can transmit and receive data via a communication network. Further, the slot machines $SL_1$ through $SL_n$ are provided with the card readers **101*b* shown in FIG. 2, respectively. The card readers 101*b* can read identification information about an individual player or history information about games recorded on a card 101. The slot machines $SL_1$ to $SL_n$ are connected to a management system 91 via the network interface 100 and the network cable 90**.

Players $P_1$ to $P_n$ insert their cards into the card readers of the game machines respectively. At least points of gaming value corresponding to tokens, data to be used for identifying a player possessing the card, and data concerning the number of inserted tokens (i.e., points of a card) and the number of tokens paid are recorded on the card. The card reader reads such personal data sets and outputs the data to the management system 91. The management system 91 records and manages the thus-input individual data concerning respective players. On the basis of the input personal data, the management system 91 monitors a difference between the number of tokens inserted (i.e., points of a card) and the number of tokens paid, and compares the difference with a predetermined reference value. If the difference is greater than the reference value, a control operation for extending a game time of a corresponding game machine is performed via the communication network.

There will now be described a coefficient which is used by the management system 91 for extending game times of respective game machines via the communication network, and a formula. First, there is determined a time coefficient (5) to be used for reducing weighting factors as time goes back to the past.

$$1/(n+1)^2 \quad (5)$$

where "n" represents the number of days over which time goes back to the past from today.

A total number of tokens lost in one day L is determined by Equation (6).

$$L=C_i-C_o \quad (6)$$

It is provided that the total number of tokens lost in the $n^{th}$ day before today is taken as $L_n$, the number of tokens lost three days before can be determined as follows, in consideration of a time coefficient $$(L_3\times1)/(3+1)^2=L_3\times1/16.$$

The amount of loss accumulated over "n" days, including today (0 day) is taken as TLN. TLN is determined, by determining a product between a total amount of loss $L_n$ having occurred the "n" days ago and the time coefficient, and adding all the products from 0 to "n." For instance, the amount of accumulated loss TLN for seven days, including today, can be determined as follows.

$$TLN=(\text{total amount of loss occurred today } L_0)\times1+(\text{total amount of loss occurred yesterday } L_1)\times1/4+(\text{total amount of loss occurred two days ago } L_2)\times1/9+(\text{total amount of loss occurred three days ago } L_3)\times1/16+(\text{total amount of loss four days ago } L_4)\times1/25+(\text{total amount of loss occurred five days ago } L_5)\times1/36+(\text{total amount of loss occurred six days ago } L_6)\times1/49+(\text{total amount of loss occurred seven days ago } L_7)\times1/64.$$

In a case where the thus-determined TLN is large, the management system 91 extends the game adjustment time $t_0$ shown in FIG. 3. As shown in FIG. 8, the time interval of one game may be made large. For example, as shown in FIG. 3, if the time $t_3$ at which the reels 4 to 6 are spun at a predetermined rotational speed is extended, the reels do not start deceleration until the time $t_3$ is passed after the reels spin at the predetermined rotational speed. As a result, the player can be afforded time to reconsider the present circumstances calmly. Consequently, the player can recover his/her sense of judgment, thereby avoiding squandering of money.

Such a game machine management system enables concentrated management of data concerning a player specified by personal data; that is, data concerning the number of tokens inserted (i.e., points of a card) and the number of tokens paid via the communications network. Consequently, the number of tokens inserted (i.e., points of a card) and the number of tokens paid relating to each of the players can be efficiently managed.

In the slot machine, the time required for paying tokens when a win has been achieved may be adjusted. For example, in a case where the loss coefficient L is small (i.e., when a player enjoys wins), if the time required for paying tokens is extended, payout of tokens does not end soon. As a result, when the player has achieved a big win, the player can be given a strong feeling of achievement or superiority. It is also possible to enable the player to start the next game within an allowed extent, by shortening the time required for paying tokens.

In a case where the loss coefficient has become large, extension of the time required from the start of one game until the end of the game is naturally applicable to game machines, such as a draw poker game machine, a blackjack game machine, or an Keno game machine, as well as to a mechanical spinning type slot machine and a video type slot machine which depicts spinning reels.

As mentioned above, in the case of the slot machine of the embodiment, when a loss coefficient has become large, the time required from the start of one game until the end of the game becomes longer, thereby affording the player time to reconsider the present circumstances calmly. Consequently, the player recovers his/her sense of judgment, thereby avoiding squandering of money. When the number of tokens paid has become greater than the number of inserted tokens, the player enjoys wins over games. Hence, the time required from the start of one game until the end of the game is extended, thereby enabling a player to sufficiently enjoy a feeling of achievement and superiority.

What is claimed is:

1. A game machine comprising:

a monitor for monitoring an updated loss coefficient calculated by factors at least including a difference between an amount of game value inserted into the game machine and an amount of game value paid by the game machine, a game interval time from an end of a preceding game to a following game and a number-of-tokens-bet coefficient determined by dividing a number of bets in a plurality of predetermined periods with an average number of tokens bet on the same model of the gaming machine in a predetermined area, the gaming machine and the same model of the gaming machine being connected to a management device which monitors a difference between a number of tokens inserted and a number of tokens paid of each gaming machine;

a comparator for comparing the updated loss coefficient with a preset reference value; and an adjuster for extending a spinning time of a reel spin during a game performed on the gaming machine;

wherein the adjuster extends the spinning time when the updated loss coefficient is greater than the reference value.

2. The game machine as set forth in claim 1, further comprising:

a reader, which reads personal data of a player from a data storage; and a communicator, which transmits and receives data concerning the amount of game value inserted into the game machine and the amount of game value paid by the game machine for the player specified by the personal data via a communication network.

3. The game machine as set forth in claim 1, wherein the difference is a result of subtracting a total amount of payout game value in which the game machine dispenses as award through at least one game from a total amount of inserted game value in which a player inserts into the game machine through at least one game.

4. A system for managing at least one of a plurality of game machines coupled to a communications network, comprising:

(1) at least one game machine, having a monitor for monitoring an updated loss coefficient calculated by factors at least including a difference between an amount of game value inserted into the game machine and an amount of game value paid by the game machine, a game interval time from an end of a preceding game to a following game, and a number-of-tokens-bet coefficient determined by dividing a number of bets in a plurality of predetermined periods with an average number of tokens bet on the same model of the gaming machine in a predetermined area, the gaming machine and the same model of the gaming machine being connected to the system, which monitors a difference between a number of tokens inserted and a number of tokens paid of each gaming machine;

a comparator for comparing the updated loss coefficient with a preset reference value;

an adjuster for extending a spinning time of a reel spin during a game performed on the monitor, wherein the spinning time of a reel spin is adjusted by the adjuster based on the updated loss coefficient;

a reader, which reads personal data of a player from a data storage; and a communicator, which transmits and receives data concerning the amount of game value inserted into the game machine and the amount of game value paid by the game machine for the player specified by the personal data via the communication network, and (2) a game machine manager, which manages data concerning the amount of game value inserted into the game machine and the amount of game value paid by the game machine for a player specified by the personal data, the data including a weighting factor for reducing the past loss coefficient as time goes back to past, and the data being received from the at least one of game machines via the communication network.

5. A method of controlling a game machine, comprising the steps of:

monitoring an updated loss coefficient calculated by factors at least including a difference between an amount of game value inserted into the game machine and an amount of game value paid by the game machine, a game interval time from an end of a preceding game to a following game, and a number-of-tokens-bet coefficient determined by dividing a number of bets in a plurality of predetermined periods with an average number of tokens bet on the same model of the gaming machine in a predetermined area, the gaming machine and the same model of the gaming machine being connected to a management device which monitors a difference between a number of tokens inserted and a number of tokens paid of each gaming machine;

comparing the updated loss coefficient with a preset reference value; and extending a spinning time of a reel spin during a game performed on the monitor, wherein the spinning time of a reel spin is adjusted by the adjuster based on the updated loss coefficient.

6. The method as set forth in claim 5, further comprising the steps of:

displaying a plurality of spinning reels, each reel having a plurality of symbols, wherein the extension of the spinning time is performed by extending a spinning time, during which the spinning reels spin at a predetermined speed before the spinning reels decelerate toward stop condition, when the updated loss coefficient is greater than the reference value.

7. The method as set forth in claim 5, further comprising the steps of:

displaying a plurality of spinning reels which spin at a predetermined speed, each reel having a plurality of symbols;

stopping each reel, wherein the extension of the spinning time is performed by extending a deceleration time during which the spinning reels decelerate until the spinning reels reach a stop condition when the updated loss coefficient is greater than the reference value.

8. The game machine control method as set forth in claim 5, further comprising the steps of:

displaying a plurality of spinning reels which spin at a predetermined speed, each reel having a plurality of symbols;

starting spin of each reel based on a starting operation by the player, wherein the extension of the spinning time is performed by extending an acceleration time during which the spinning reels accelerate until the spinning reels reach the predetermined speed when the updated loss coefficient is greater than the reference value.

9. The method as set forth in claim 5, further comprising the steps of:

displaying a plurality of spinning reels, each reel having a plurality of symbols;

starting spin of each reel based on a starting operation by player, wherein the extension of the spinning time is performed by extending a preliminary time from a starting operation by the player until the spinning reels start spinning when the updated loss coefficient is greater than the reference value.

10. The method as set forth in claim 5, further comprising the steps of:

reading personal data of a player from a data storage; and transmitting and receiving data concerning the amount of game value inserted into the game machine and the amount of game value paid by the game machine for the player specified by the personal data via a communication network.

11. The method as set forth in claim 5, wherein the difference is a result of subtracting a total amount of payout game value in which the game machine dispenses as award through at least one game from a total amount of inserted game value in which a player inserts into the game machine through at least one game.

* * * * *